US005675466A

United States Patent [19]
Matsumoto et al.

[11] Patent Number: 5,675,466
[45] Date of Patent: Oct. 7, 1997

[54] ASSEMBLY STRUCTURE OF SELF-TURN-OFF SWITCHING DEVICE AND SNUBBER CIRCUIT THEREFOR

[75] Inventors: Toshiaki Matsumoto; Kenji Kijima, both of Tokyo, Japan

[73] Assignee: Kabushiki Kaisha Toshiba, Kawasaki, Japan

[21] Appl. No.: 592,549

[22] Filed: Jan. 26, 1996

[30] Foreign Application Priority Data

Jan. 31, 1995 [JP] Japan ................................ 7-013336

[51] Int. Cl.⁶ ....................................................... H02H 9/00
[52] U.S. Cl. ................................................ 361/54; 363/56
[58] Field of Search .......................... 361/91, 111, 18, 361/58, 54, 704, 711, 712, 707, 709, 717; 363/50-58, 123, 127, 128, 141, 144

[56] References Cited

U.S. PATENT DOCUMENTS 5,055,990  10/1991  Miki et al. ............................ 363/56
5,132,896  7/1992  Nishizawa et al. .................. 363/144

*Primary Examiner*—Jeffrey A. Gaffin
*Assistant Examiner*—Ronald W. Leja
*Attorney, Agent, or Firm*—Oblon, Spivak, McClelland, Maier & Neustadt, P.C.

[57] ABSTRACT

An assembly structure of a self-turn-off switching device and a snubber circuit connected in parallel with the self-turn-off switching device. The snubber circuit is composed of at least a series circuit of a snubber diode and a snubber capacitor. The assembly structure includes the self-turn-off switching device, the snubber diode and the snubber capacitor. The assembly structure also includes a conductive heat sink on which the self-turn-off switching device is mounted at a first surface thereof and the snubber diode is mounted at a first surface thereof, for cooling the self-turn-off switching device and the snubber diode and for connecting the first surfaces of the self-turn-off switching device and said snubber diode. The assembly structure further includes a first conductor on which the snubber diode is mounted at a second surface thereof for connecting the second surface of the snubber diode and a first terminal of the snubber capacitor, a second conductor positioned in parallel with the first conductor for connecting a second terminal of the snubber capacitor and a second surface of the self-turn-off switching device, and an insulating spacer positioned between the first and second conductors for insulating the first and second conductors.

9 Claims, 12 Drawing Sheets

ASSEMBLY STRUCTURE OF SELF-TURN-OFF SWITCHING DEVICE AND SNUBBER CIRCUIT THEREFOR

BACKGROUND OF THE INVENTION

1. Field of the Invention

This invention relates to an assembly structure of a self-turn-off switching device and a snubber circuit therefor which performs the absorption of the surge voltage and the suppression of the rising rate of the OFF-state voltage generated during the turn-off of the self-turn off switching device.

2. Description of the Related Art

Hereinafter, the description will be made in the cases where the self-turn-off switching device is a gate turn-off thyristor (hereinafter stated as a "GTO").

In recent years, with the advances in the capacity increases of GTO, GTO with ratings of above 6 kV–6 kA have already been developed. The snubber circuit, which performs bypass of the turn-off current, can be cited as one important element when a GTO turns off a large current. Snubber circuits with low inductance are required to suppress the surge voltages to low values when large currents are turned off in a conversion system using GTOs.

FIG. 16 is a circuit diagram showing a snubber circuit of a GTO 1. The snubber circuit consists of a snubber diode 2, a snubber resistor 3 connected in parallel to snubber diode 2 and a snubber capacitor 4 connected in series with snubber diode 2, so as to bypass between the anode and cathode electrodes of GTO 1. The snubber circuit performs the absorption of the surge voltage and the suppression of the rising rate of the OFF-state voltage generated during the turn-off of GTO 1. Also, GTO 1 is controlled by a gate driving circuit 5 for supplying ON and OFF signals to GTO 1.

The following is a description of prior art using the water-cooled assembly structure of a GTO and a snubber circuit shown in FIG. 15. GTO 1 is a flat type device, and is cooled by being sandwiched between water-cooled heat sinks 7i and 7j which have the dual role of main circuit conductors in a stack 6. In the snubber circuit, water-cooled heat sink 7j connected to the anode electrode of GTO 1 is connected to the anode electrode of a snubber diode 2A by a conductor 8a. In the snubber circuit, the number of snubber diodes in series is determined to match the circuit voltage. In the case of this drawing, snubber diode 2 is composed of two single-side cooling and triangular base type diodes 2A and 2B. These diodes 2A and 2B have the same configuration but mutually reversed electrode structures, which are connected in series via a water-cooled heat sink 7k.

The cathode electrode of snubber diode 2B is connected to one electrode of snubber capacitor 4 using a conductor 8b. The other electrode of snubber capacitor 4 is connected to water-cooled heat sink 7i connected to the cathode electrode of GTO 1 by a conductor 8c. Snubber resistor 3 is connected between conductors 8a and 8b.

FIG. 18 shows a current $I_T$ which flows is GTO 1, a voltage V of GTO 1 and a snubber current $I_S$, when GTO 1 is turned OFF. When GTO 1 is turned OFF, GTO current $I_T$ rapidly reduces (that is to say, snubber circuit current $I_S$ rapidly increases). Spike voltage $V_{DSP}$ generated during the falling time of GTO current $I_T$ is composed of the sum of four main voltage components which are the charged voltage of the snubber capacitor, the voltage generated due to the inductance in the snubber circuit, the forward recovery voltage of the snubber diode and the voltage drop due to the resistance component in the snubber circuit. It is necessary to suppress the value of spike voltage $V_{DSP}$ to below the specified level tolerated by the GTO. This is because, when spike voltage $V_{DSP}$ exceeds the specified value, the GTO will break down, with the result that it is unable to maintain the function of the conversion system.

However, whether or not the target minimization of circuit inductance could be achieved with the actual assembly structure of the GTO and the snubber circuit at the technology level hitherto, it could only be evaluated for the first time by turning off actual currents after producing the conversion system using such assembly structures. In a case where the spike voltage $V_{DSP}$ could not be suppressed below the specified value, either the design was re-investigated, or the system rating was determined by a turn-off current wherein spike voltage $V_{DSP}$ is below the specified value, resulting in the system design wherein the turn-off capacity of the GTO was not fully displayed.

At this stage, it is understood that, out of the four voltage components mentioned above which compose spike voltage $V_{DSP}$, apart from the charged voltage of the snubber capacitor, spike voltage $V_{DSP}$ depends greatly on the voltage component generated by the inductance in the snubber circuit. Therefore, reduction of the inductances of the snubber circuit parts themselves, and minimization of the effective inductance due to the circuit wiring structure are important elements for the design of the assembly structure of the GTO and the snubber circuit therefor.

The widely used calculation equations for obtaining an effective inductance $L_{ef}$ of conductors is as follows. The equation for calculating effective inductance $L_{ef}$ is shown as follows.

$$L_{ef} = L - M \tag{1}$$

The equation for calculating a self inductance L is shown as follows.

$$L = 2 * l(\log_e(2*l/R) - 1 + R/l) \quad [\text{nH}] \tag{2}$$

The equation for calculating a self inductance M is shown as follows.

$$M = 2 * l(\log_e(2*l/D) - 1 + D/l) \quad [\text{nH}] \tag{3}$$

Here, $l > R, l > D$ l: Bus length [cm]

R: Self geometrical mean distance [cm]

D: Mutual geometrical mean distance [cm]

Distances R and D in the return square buses shown in FIG. 19 are obtained by the following equations (4-1), (4-2)

$$R = 0.2235(a+b) \text{(Approximation equation)} \tag{4-1}$$

$$\log_e D = 1/2 * ((c + 2*a)/a)^2 * \log_e R_{c+2a} - \\ ((c+a)/a)^2 * \log_e R_{c+a} + \\ 1/2 * (c+a) * \log_e R_c \tag{4-2}$$

Here, $R_{c+2a}$: Self geometrical mean distance of the square b by (c+2a)

$R_{c+a}$: Self geometrical mean distance of the square b by (c+a)

$R_c$: Self geometrical mean distance of the square b by c

From the above, effective inductance $L_{eff}$ of the return of the square return buses shown in FIG. 19 is shown as follows:

$$L_{eff} = 2(L - M) \quad (5)$$
$$= 4 * l * \log_e (D/R) \, [nH]$$

That is to say, it is understood from equation (5) that, to reduce effective inductance $L_{eff}$, self geometrical mean distance R should be made larger. In practice, the same plane of the buses should be made broader. Also, it is understood that mutual geometrical mean distance D should be made smaller. In practice, the gap of the return buses should be made smaller.

Moreover, the conductors should be constructed so that the magnetic fields generated by the flows of the currents in the conductors are cancelled out.

Recently there has been a tendency that the capacity of GTO is increasing. Furthermore, high voltage and large current characteristics are simultaneously sought in a GTO. In the selection of snubber diode, in order to eliminate unnecessary undershoot of the GTO anode voltage, it is necessary to use a high-speed diode with a small recovery charge Qr. Such high-speed diodes are a stud type diode which is directly screwed to the heat sink, or a triangular base type diode which is mounted on the heat sink by bolts. However, as diodes of these types have small capacities, in order to deal with the tendency of high voltage and large current of the GTO, these diodes are to be used by series-parallel connection.

in the case of the prior art assembly structure of the GTO and snubber circuit shown in FIG. 17, the number of series diodes is two and two triangular base type high-speed diodes are used as snubber diode 2. In this case, in each of the triangular base type diodes 2A and 2B, one electrode is the mounting surface to which the diode is mounted on the cooling body, and the other electrode is a hook terminal. Therefore, when connecting respectively conductor 8a and conductors 8b and 8c to snubber diodes 2A and 2B, the mutual inductance which acts to cancel out the self inductances of conductor 8a and conductors 8b and 8c can hardly be expected. In other words, the conductor 8a and conductors 8b and 8c cannot be composed so that conductor 8a and conductors 8b and 8c are positioned in parallel and the directions of the currents flowing through the conductor 8a and conductors 8b and 8c are opposite. Furthermore, two diodes 2A and 2B are in series, the conductor loop of the snubber circuit becomes large, resulting in that, a low inductance structure is even mope difficult. Needless to say, because the tendency of the large voltage makes it necessary to maintain the corresponding withstand voltage capacity. Because of such insulation design, making the system large-scale cannot be avoided. Thus, low-inductance, of the assembly structure of the GTO and snubber circuit therefor was even more difficult.

The following is a description of the operation of an assembly structure of a GTO and a plurality of parallel connected snubber circuits. When the GTO is turned OFF, the Current reaches several thousands amperes, and the time variation of the current at that time reaches several thousands amperes/microsec. Therefore, the shunt unbalance of the snubber currents significantly influences the shared voltages of respective parts which compose the snubber circuits. Suppose the case of the arrangement of snubber circuits being asymmetrical. The current readily flows in a snubber circuit with a small circuit inductance. Thus, a large current flows in the snubber capacitor in this snubber circuit, and readily increases the charged voltage of this snubber capacitor. As a result, the forward recovery voltage of the snubber diode of this snubber circuit also increases. On the other hand, the current flowing in a circuit with a large circuit inductance is small. However, the voltage generated by this snubber circuit is high due to the circuit inductance being large. Thus, both snubber circuit voltages become higher, resulting in that they are balanced. Therefore, though the snubber circuits are deliberately made parallel, effective reduction of spike voltage $V_{DSP}$ cannot be achieved.

FIG. 20 is another example of a prior art assembly structure in which snubber diode 2 is directly mounted on the side face of heat sink 6j of GTO 1. When compared with FIG. 17, the connection distances of the conductors are shorter. However, in this case also, in view of the structures of the conductors, the mutual inductance which cancels out the self-inductances is small. Therefore, the effective inductance due to the conductors does not become smaller.

SUMMARY OF THE INVENTION

Accordingly, one object of this invention is to provide an assembly structure of a self-turn-off switching device and a snubber circuit therefor which can reduce the spike voltage generated when the self-turn-off switching device is turned OFF.

Another object of this invention is to provide an assembly structure of a self-turn-off switching device and a snubber circuit therefor which can reduce an effective inductance of this assembly structure to reduce the spike voltage.

Still another object of this invention is to provide an assembly structure of a self-turn-off switching device and a snubber circuit therefor which can be made small in size.

A further object of this invention is to provide an assembly structure of a self-turn-off switching device and a snubber circuit therefor which can utilize the capacity of the self-turn-off switching device to a maximum.

These and other objects of this invention can be achieved by providing an assembly structure of a self-turn-off switching device and a snubber circuit connected in parallel with the self-turn-off switching device. The snubber circuit is composed of at least a series circuit of a snubber diode and a snubber capacitor. The assembly structure includes the self-turn-off switching device, the snubber diode, and the snubber capacitor. The assembly structure also includes a conductive heat sink on which the self-turn-off switching device is mouted at a first surface thereof and the snubber diode is mounted at a first surface thereof, for cooling the self-turn-off switching device and the snubber diode and for connecting the first surface of the self-turn-off switching device and the first surface of the snubber diode. The assembly structure further includes a first conductor on which the snubber diode is mounted at a second surface thereof opposite to the first surface of the snubber diode for connecting the second surface of the snubber diode and a first terminal of the snubber capacitor, a second conductor positioned in parallel with the first conductor for connecting a second terminal of the snubber capacitor and a second surface of the self-turn-off switching device opposite to the first surface thereof, and an insulating spacer positioned between the first conductor and the second conductor for insulating the first conductor and the second conductor.

According to one aspect of this invention, there can be provided an assembly structure of a self-turn-off switching device and a first snubber circuit and a second snubber circuit connected in parallel with the self-turn-off switching device. The first snubber circuit is composed of at least a series circuit of a first snubber diode and a first snubber capacitor, and the second snubber circuit is composed of at least a series circuit of a second snubber diode and a second snubber capacitor. The assembly structure includes the self-turn-off switching device, the first snubber diode, the first snubber capacitor, the second snubber diode, and the second snubber capacitor. The assembly structure also includes a conductive heat sink on which the self-turn-off switching device is mounted at a first surface thereof, the first snubber diode is mounted at a first surface thereof and the second snubber diode is mounted at a first surface thereof, for cooling the self-turn-off switching device and the first and second snubber diodes and for connecting the first surface of the self-turn-off switching device and the first surfaces of the first and second snubber diodes. The assembly structure further includes a first conductor on which the first snubber diode is mounted at a second surface thereof opposite to the first surface of the first snubber diode for connecting the second surface of the first snubber diode and a first terminal of the first snubber capacitor, a second conductor positioned in parallel with the first conductor for connecting a second terminal of the first snubber capacitor and a second surface of the self-turn-off switching device opposite to the first surface thereof, and a first insulating spacer positioned between the first conductor and the second conductor for insulating the first conductor and the second conductor. The assembly structure also includes a third conductor on which the second snubber diode is mounted at a second surface thereof opposite to the first surface of the second snubber diode for connecting the second surface of the second snubber diode and a first terminal of the second snubber capacitor, a fourth conductor positioned in parallel with the third conductor for connecting a second terminal of the second snubber capacitor and the second surface of the self-turn-off switching device opposite to the first surface thereof, and a second insulating spacer positioned between the third conductor and the fourth conductor for insulating the third conductor and the fourth conductor.

According to another aspect of this invention, there can be provided an assembly structure of a self-turn-off switching device and a plurality of snubber circuits connected in parallel with the self-turn-off switching device. Each of the snubber circuits is composed of at least a series circuit of a snubber diode and a snubber capacitor. The assembly structure includes the self-turn-off switching device, a plurality of the snubber diodes, and a plurality of the snubber capacitors. The assembly structure also includes a conductive heat sink on which the self-turn-off switching device is mounted at a first surface thereof and each of the snubber diodes is mounted at a first surface thereof, for cooling the self-turn-off switching device and the snubber diodes and for connecting the first surface of the self-turn-off switching device and the first surfaces of the snubber diodes. The assembly structure further includes a plurality of first conductors, on each of which one of the snubber diodes is mounted at a second surface thereof opposite to the first surface of one of the snubber diodes for connecting the second surface of one of the snubber diodes and a first terminal of one of the snubber capacitors, respectively, a plurality of second conductors, each being positioned in parallel with one of the first conductors for connecting a second terminal of one of the snubber capacitors and a second surface of the self-turn-off switching device opposite to the first surface thereof, respectively, and a plurality of insulating spacers, each being positioned between one of the first conductors and one of the second conductors for insulating one of the first conductors and one of the second conductors, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
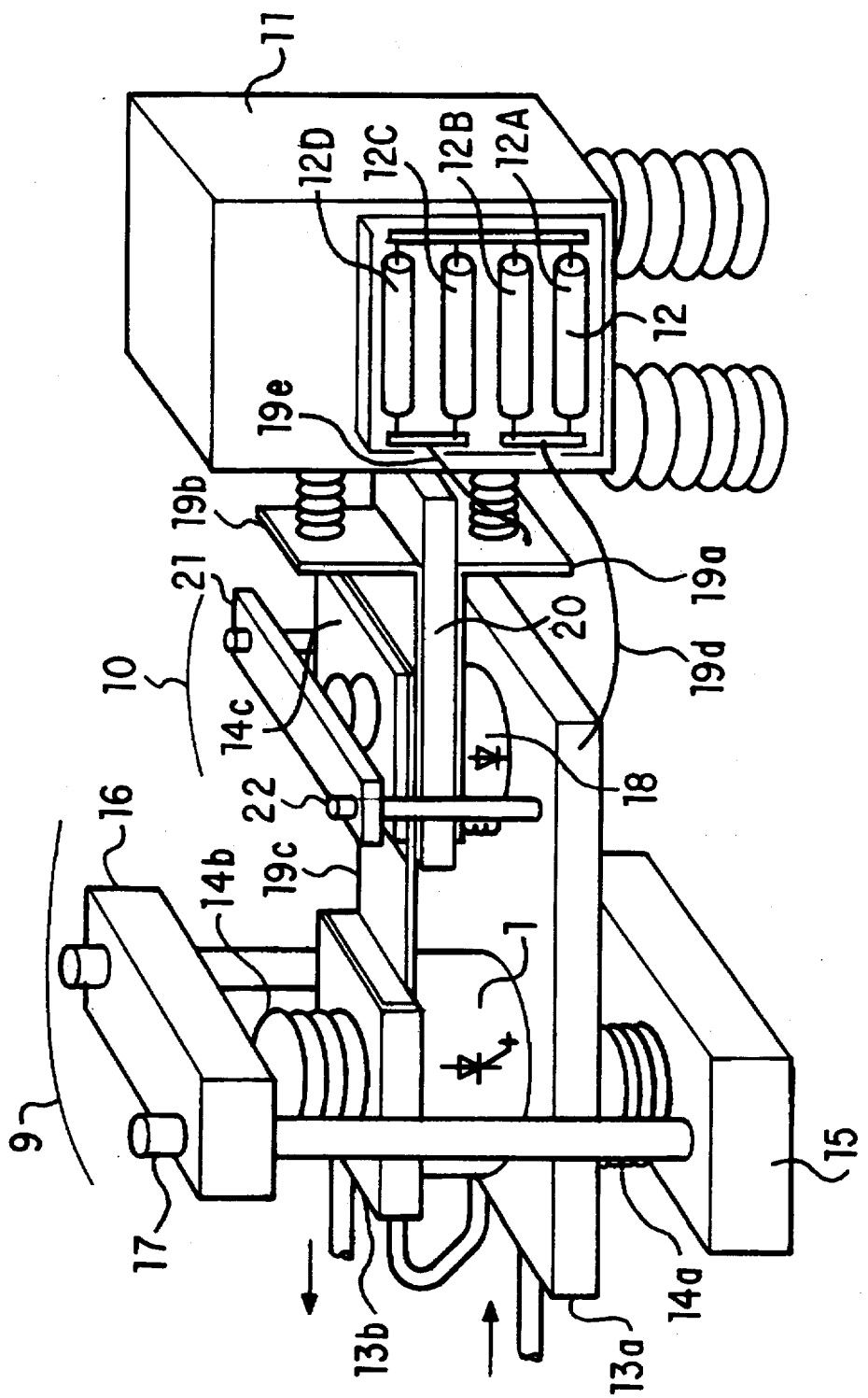
FIG. 1A is a schematic diagram showing an assembly structure of a GTO and a snubber circuit according to a first embodiment of this invention.

Referring now to the drawings, wherein like reference numerals designate indentical or corresponding parts throughout the several views, the embodiments of this invention will be described below.

FIG. 1A is a schematic diagram of an assembly structure of a GTO and a snubber circuit according to a first embodiment of this invention.

Figure 1B:
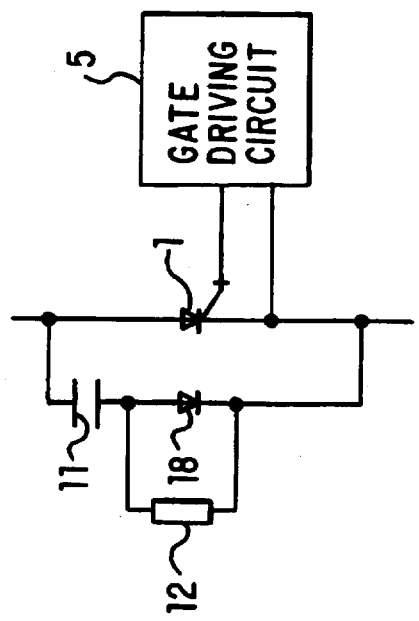
FIG. 1B is a circuit diagram of the assembly structure shown in FIG. 1A.

FIG. 1B is a circuit diagram showing this assembly structure shown in FIG. 1A. In FIG. 1B, the snubber circuit consists of a snubber diode 18, a snubber resistor 12 connected in parallel to snubber diode 18 and a snubber capacitor 11 connected in series with snubber diode 18, so as to bypass between the anode and cathode electrodes of GTO 1. The snubber circuit performs the absorption of the surge voltage and the suppression of the rising rate of the OFF-state voltage generated during the turn-off of GTO 1. Also, GTO 1 is controlled by a gate driving circuit 5 for supplying ON and OFF signals to GTO 1.

In FIG. 1A, the assembly structure is composed of a GTO stack 9, a snubber diode stack 10, snubber capacitor 11 and snubber resistor 12. Snubber resistor 12 is composed of four resistors 12A, 12B, 12C and 12D conneced in series-parallel.

GTO stack 9 is composed of GTO 1; a heat sink 13a on which the cathode side of GTO 1 is mounted; an insulating seat 14a mounted on the opposite surface of heat sink 13a to the surface on which GTO 1 is mounted; a base 15 mounted on the opposite surface of insulating seat 14a to the surface which is mounted on heat sink 13a; a heat sink 13b on which the anode side of GTO 1 is mounted; an insulating seat 14b mounted on the opposite surface of heat sink 13b to the surface on which GTO 1 is mounted; a presser board 16 mounted on the opposite surface of insulating seat 14b to the surface which is mounted on heat sink 13b; and studs 17 which connect base 15 and presser board 16.

Snubber diode stack 10 is composed of snubber diode 18; heat sink 13a on which the cathode side of snubber diode 18 is mounted; a thin board conductor 19a on which the anode side of snubber diode 18 is mounted; an insulating spacer 20 on which conductor 19a is mounted; a thin board conductor 19b mounted on the opposite surface of insulating spacer 20 to the surface on which conductor 19a is mounted; a thin board conductor 19c mounted on the surface of insulating spacer 20 over conductor 19b; an insulating seat 14c mounted on the opposite surface of conductor 19c to the surface which is mounted on insulating spacer 20; a presser board 21 mounted on the opposite surface of insulating seat 14c to the surface which is mounted on conductor 19c; and studs 22 which connect heat sink 13a and presser board 21.

Heat sink 13a also functions as a conductor which connects the cathode of GTO 1 to the cathode of snubber diode 18. Conductor 19a mounted on the anode of snubber diode 18 is connected to one terminal of snubber capacitor 11. Conductor 19b is connected to the other terminal of snubber capacitor 11. Conductor 19c is connected to heat sink 13b which also functions as a conductor and on which the anode of GTO 1 is mounted. One terminal of snubber resistor 12 composed of four resistors 12A–12D is connected to heat sink 13a by a conductor 19d, and the other terminal is connected to conductor 19a by a conductor 19e.

Although not illustrated, in the case of the current capacity being large and the snubber circuit conductor breadths being limited by their relationship to the assembly structure, the thicknesses of conductors 19a, 19b and are not made thicker. Instead, for each of conductors 19a, 19b and 19c, a structure is adopted in which several sheets of thin conductor are used and very thin films are inserted between these conductors.

By using this type of assembly structure, the mutual gap distance of the return paths of the snubber circuit current can be shortened to the solid insulating distance of insulating spacer 20, that is to say to the thickness of insulating spacer 20. By this means, mutual geometrical mean distance D in the above Equation (4-2) can be minimized. Also, as self geometrical mean distance R is increased by making conductors 19a and 19b thin and board, mutual inductance M can be maximized. By these means, effective inductance $L_{ef}$ can be minimied. Also, as the frequency of the current in the GTO is high, the current flows on the surfaces of the conductors by the skin effect. Thus, thin conductors are also suitable for this purpose with respect to the efficiency of the conversion system.

Figure 2:
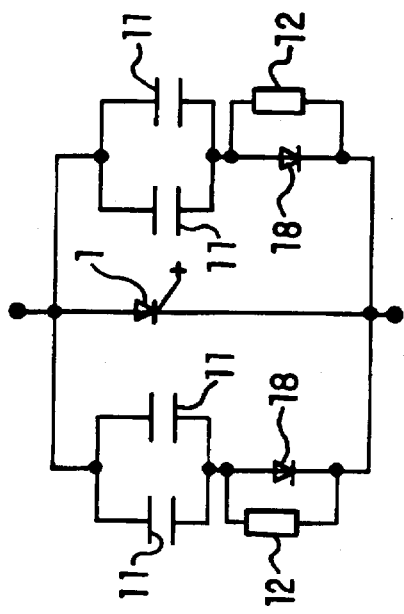
FIG. 2 is a circuit diagram of an assembly structure according to a second embodiment of this invention.
Figure 3:
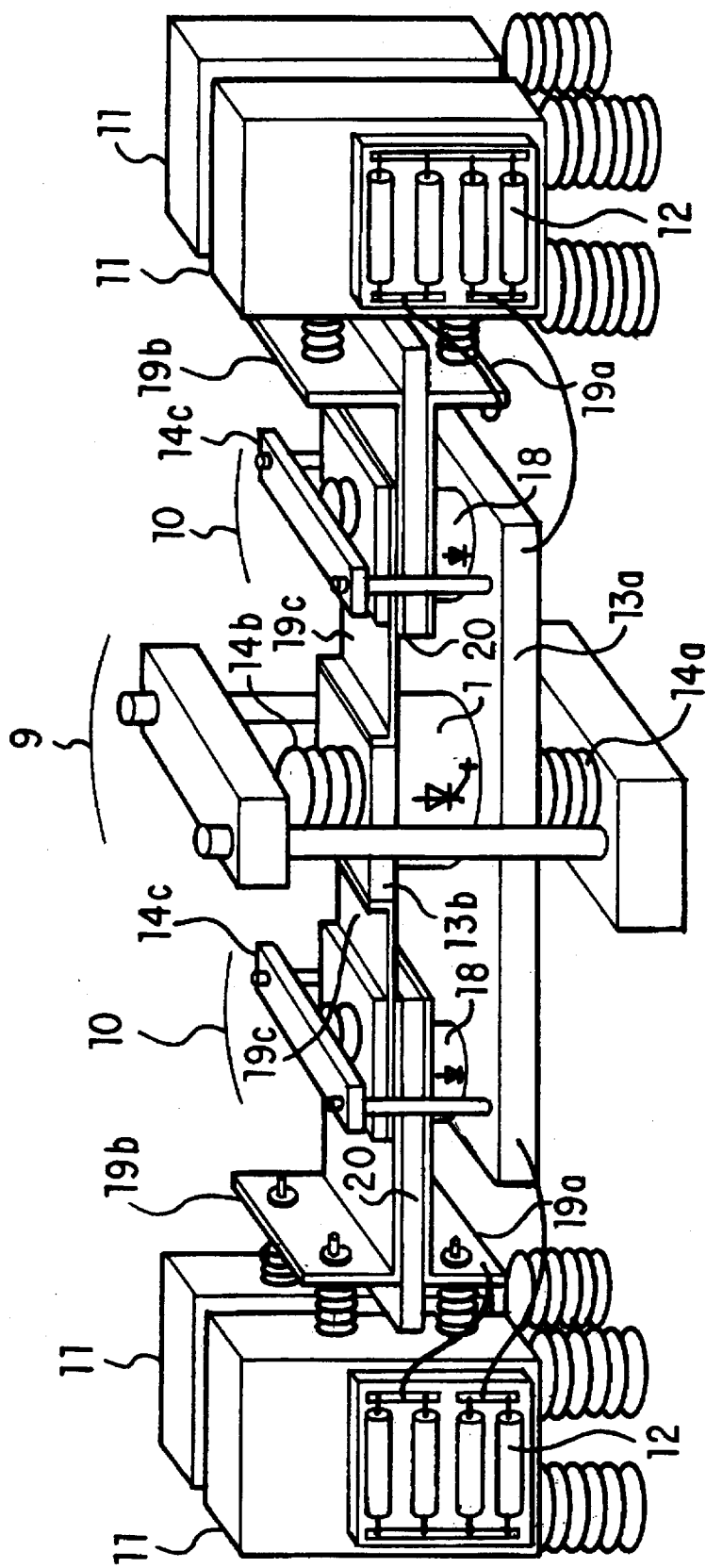
FIG. 3 is a schematic diagram showing the assembly structure shown in FIG. 2.

The following is a description of a second embodiment of this invention with reference to the drawings. FIG. 2 is a circuit diagram of a GTO and a double parallel snubber circuits. FIG. 3 is a schematic drawing of an assembly structure of the circuit shown in FIG. 2 according to a second embodiment of this invention.

As shown in FIG. 2 and FIG. 3, in the assembly structure of this embodiment, two snubber circuits are connected in parallel to GTO 1. Furthermore, in each of snubber circuits, there are provided two parallel connected snubber capacitors 11. Snubber diode stacks 10, snubber capacitors 11 connected in parallel and snubber resistors 12 are symmetrically positioned about GTO stack 9 as the center, respectively.

GTO stack 9 and each of snubber diode stacks 10 themselves have the same structures as in the first embodiment, except that heat sink 13a is common to GTO stack 9 and two snubber diode stacks 10. Thus, in the two snubber circuits, the circuits due to heat sink 13a and conductors 19a, 19b and 19c have the same conductor resistances with the same conductor connection distances.

By using this type of the assembly structure, the electrical resistances and circuit inductances of respective paralleled snubber circuits are made uniform. Thus, the currents flowing in respective snubber circuits and their time variations are made equal. By this means, the main four voltage components which are the charged voltages of respective snubber capacitors 11, the voltages generated by the inductances in respective snubber circuits, the forward recovery voltages of respective snubber diodes 18 and, the voltage drops due to the resistance components in respective snubber circuits will be balanced in the two snubber circuits at their minimum voltage values, respectively. Therefore, effective reduction of spike voltage $V_{DSP}$ can be achieved.

Figure 4B:
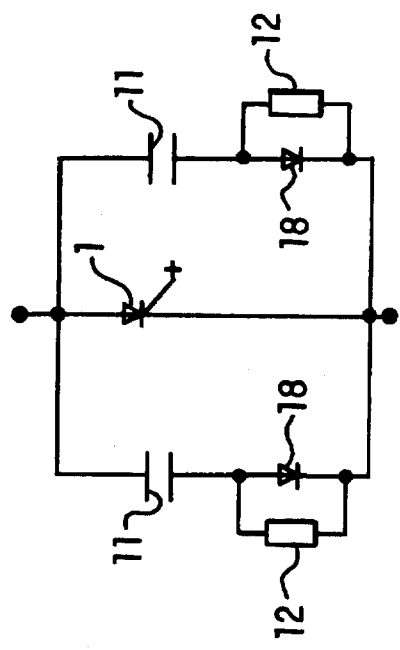
FIG. 4B is a circuit diagram of the assembly structure shown in FIG. 4A.
Figure 4C:
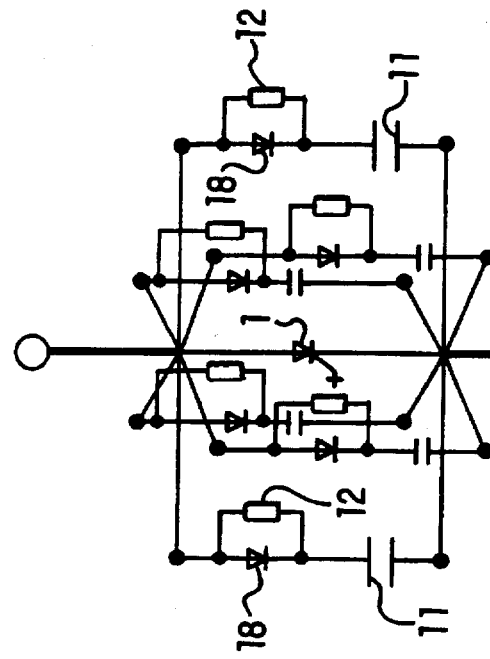
FIG. 4C is a circuit diagram of an assembly structure according to a fourth embodiment of this invention.
Figure 4A:
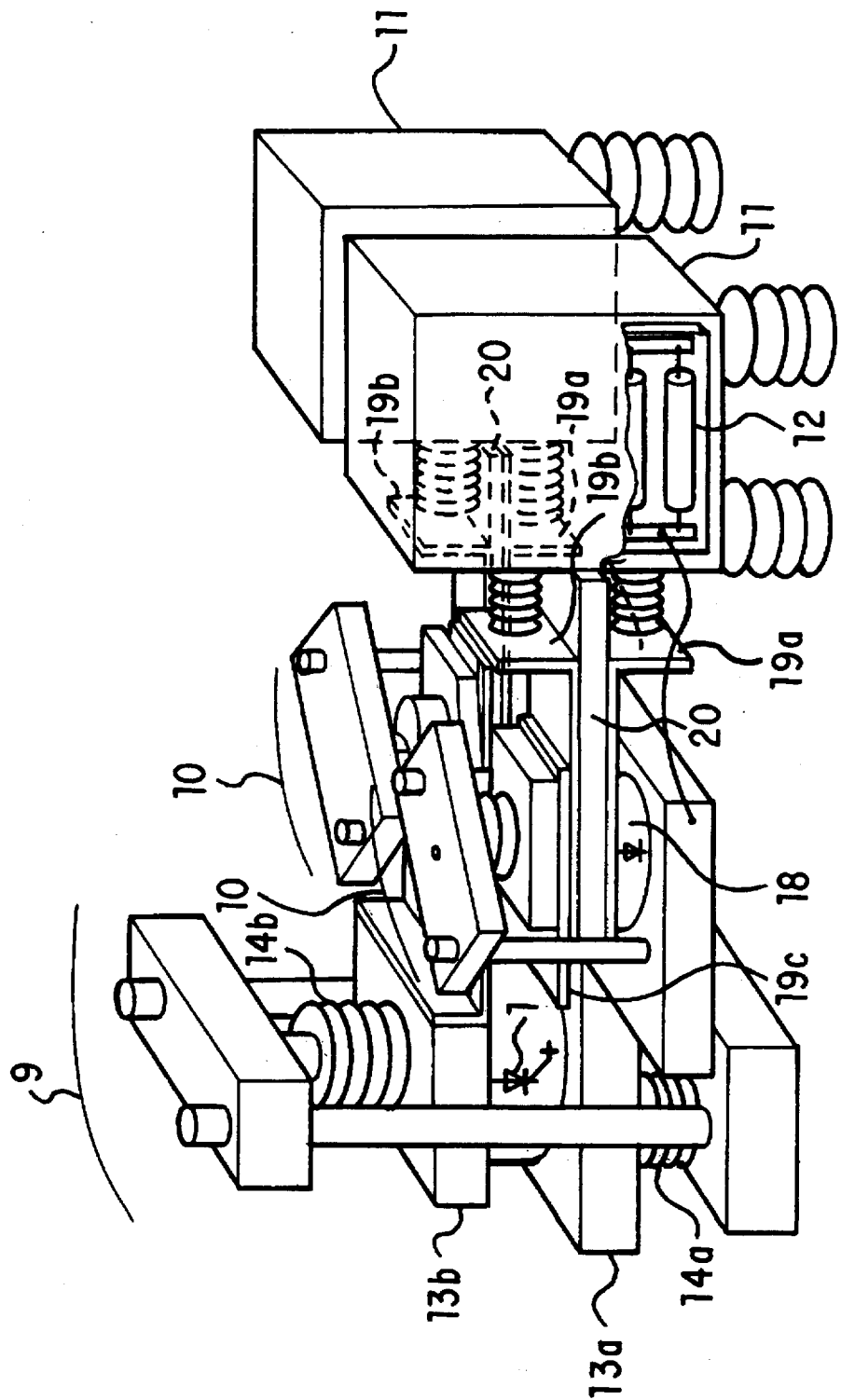
FIG. 4A is a schematic diagram showing an assembly structure according to a third embodiment of this invention.

The following is a description of a third embodiment of this invention with reference to FIGS. 4A and 4B.

FIG. 4A is a schematic drawing of an assembly structure according to a third embodiment of this invention. The circuit diagram of FIG. 4A is shown in FIG. 4B. It is noted that in the third embodiment, one snubber capacitor 11 is provided in each of snubber circuits.

As shown in FIG. 4A, in the assembly structure of this embodiment, two snubber circuits are provided in parallel to GTO 1. Respective snubber diode stacks 10, snubber capacitors 11 and snubber resistors 12 are arranged in positions to one side of GTO stack 9.

GTO stack 9 and each of snubber diode stacks 10 themselves have the same structures as in the first embodiment, except that heat sink 13a is common to GTO stack 9 and the two snubber diode stacks 10 and conductor 19c is common to the two snubber diode stacks 10. Thus, in the two snubber circuits, the circuits due to heat sink 13a and conductors 19a, 19b and 19c have the same conductor resistances with the same conductor connection distances.

By using this type of the assembly structure, the effect of this embodiment is the same as in the second embodiment.

The following is a description of a fourth embodiment of this invention with reference to the drawings. FIG. 4C is a circuit diagram of a GTO 1 and six parallel snubber circuits. Each of the snubber circuits is composed of snubber diode 18, snubber capacitor 11 and snubber resistor 12. FIG. 4C also shows a diagramatic perspective view of an assembly structure of a GTO 1 and six snubber circuits. As shown in FIG. 4C, six snubber circuits are respectively arranged in point symmetrical positions about GTO 1 as their center, Though not shown in the drawing, each snubber circuit is assembled as shown in the first embodiment shown in FIG. 1. Therefore, snubber diodes 18, snubber capacitors 11 and snubber resistors 12 are respectively arranged in point symmetrical position about GTO 1 as their center in this assembly structure of GTO 1 and six parallel snubber circuits. Therefore, connecting conductors in respective snubber circuits have the same conductor distance and conductor resistance.

Figure 5:
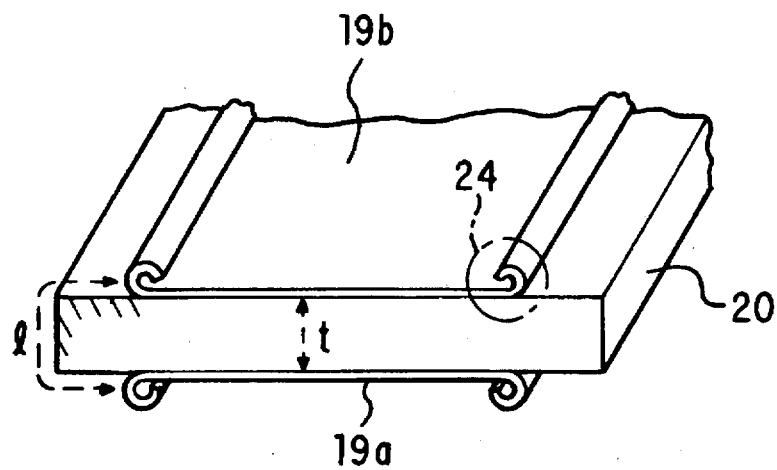
FIG. 5 is a drawing showing the relationship of an insulating spacer and conductors in an assembly structure according to a fifth embodiment of this invention.

The following is a description of a fifth embodiment of this invention with reference to the drawings. FIG. 5 is a drawing showing the relationship of the insulating spacer and the conductors in the assembly structure of the GTO and snubber circuit according to the fifth embodiment.

When this invention is applied to high-voltage system, following problem occurs.

The voltage applied to the GTO is loaded on the conductors which compose the snubber circuit. Therefore, the voltage differences between the connecting conductor from the snubber capacitor terminal to the GTO, the connecting conductor from the snubber diode to the GTO and the connecting conductor from the snubber diode to the snubber capacitor are respectively the same as the voltage applied to the GTO at the maximum. Normally, these voltage differences reache several kV.

When this invention is applied to high-voltage system so as to achieve low circuit inductance, the snubber circuit conductors are arranged in close proximity and parallel to each other. However, in the case of high voltage, the snubber circuit conductors become sharp electrodes, with the result that the field strength increases. Therefore, a corona discharge phenomenon occurs, leading to deterioration of the organic insulation material and, at the worst, causing damage such as breakdown of insulation and short-circuiting.

Also, as the directions of the currents flowing in conductors facing each other are reversed, the electromagnetic forces become repulsion forces and act to peel the conductors from the insulating spacer. For this reason, air layers are partially formed between the conductors and the insulating spacer, and air spaces with different dielectric constants are formed. Therefore, the electric field values of those parts increase and eventually cause corona discharge.

If the gap between the snubber circuit conductors is made broader, as a measure to relax this electrical field, this leads to increased inductance.

Therefore, a treatment is carried out which constructs an field relaxation shield by curling the edges of the conductors, in the fifth embodiment.

In FIG. 5, the ends of two thin broad conductors 19a and 19b which face each other in the assembly structure are respectively curled as shown by a reference numeral 24. Insulating spacer 20 which is sandwiched between two thin broad conductors 19a and 19b is broader than the breadth of each of conductors 19a and 19b. It is characterized in that the insulation between conductors 19a and 19b which face each other is coordinated by creep insulation 1 along the surface of insulating spacer 20 and solid insulation t of insulating spacer 20.

Figure 6:
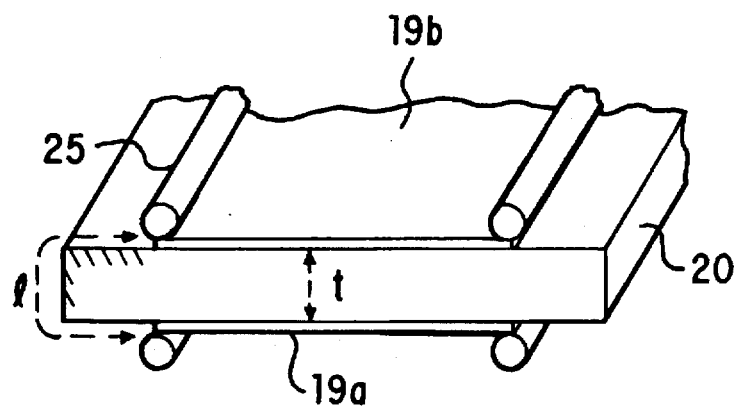
FIG. 6 is a drawing showing the relationship of an insulating spacer and conductors in an assembly structure according to a modification of the fifth embodiment of this invention.

As shown in FIG. 6, as a modification of this embodiment, there may also be a structure in which round rods 25 are respectively mounted on the ends of two thin broad conductors 19a and 19b as shields by welding or the like.

By this means, even in a high-voltage circuit, an assembly structure of a GTO and a snubber circuit with superior withstand voltage performance and low inductance can be provided.

Figure 7:
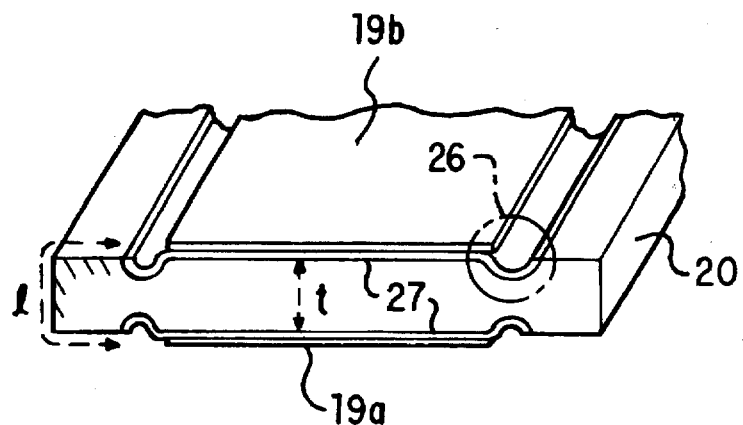
FIG. 7 is a drawing showing the relationship of an insulating spacer and conductors in an assembly structure according to a sixth embodiment of this invention.

The following is a description of a sixth embodiment of this invention with reference to the drawings. FIG. 7 is a drawing showing the relationship between the insulating spacer and the conductors in the assembly structure of the GTO and snubber circuit according to the sixth embodiment.

As shown in FIG. 5, insulating spacer 20 sandwiched between two thin broad conductors 19a and 19b is broader than the breadth of each of conductors 19a and 19b. Semi-cylindrical grooves 26 are respectively provided on both faces of insulating spacer 20 in locations adjacent to the ends of conductors 19a and 19b. Conductive paint 27 is painted on the parts of insulating spacer 20 which touch the conductors 19a and 19b and in semicylindrical grooves 26. It is characterized in that the insulation between two conductors 19a and 19b which face each other is coordinated by creep insulation 1 along the surface of insulating spacer 20 and inter-layer insulation t of insulating spacer 20.

By this means, even in a high-voltage circuit, an assembly structure of a GTO and a snubber circuit with superior withstand voltage performance and low inductance can be provided.

Figure 8:
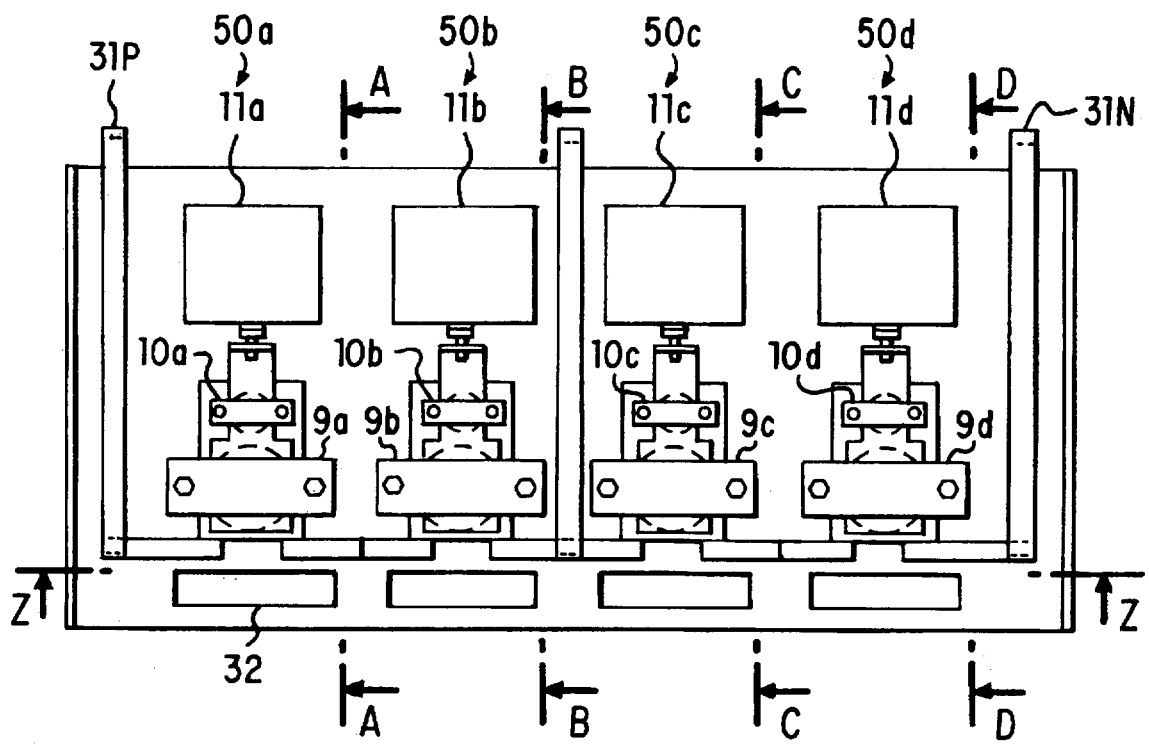
FIG. 8 is a top view of an assembly structure of one arm of an NPC type GTO inverter according to a seventh embodiment of this invention.
Figure 9:
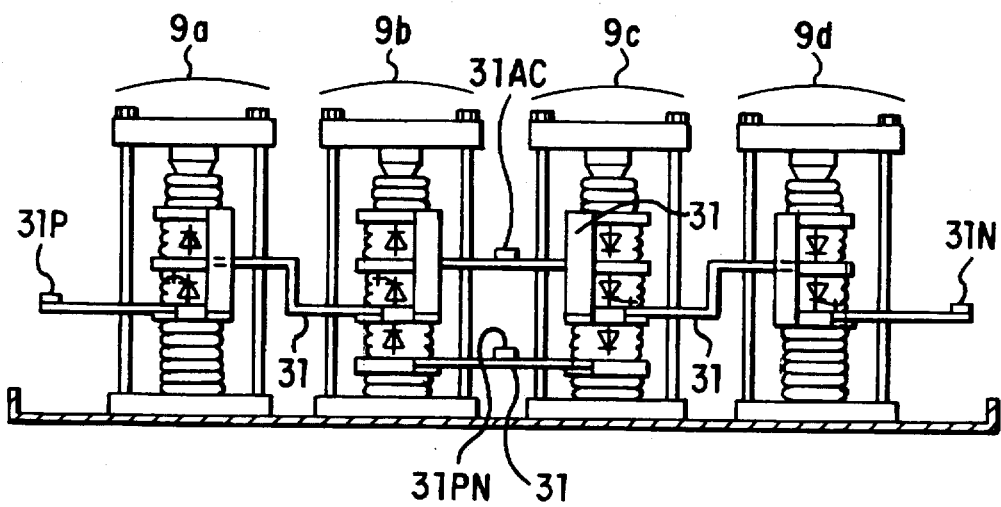
FIG. 9 is a cross-section of the one arm on the line z—z shown in FIG. 8.

The following is a description of a seventh embodiment of this invention with reference to FIG. 8 to FIG. 14. FIG. 8 is a top view of one arm of an NPC (neutral point clamp) type GTO inverter circuit structured as GTO modules. FIG. 9 is a cross-section of the one arm on the line Z—Z shown in FIG. 8.

Figure 10:
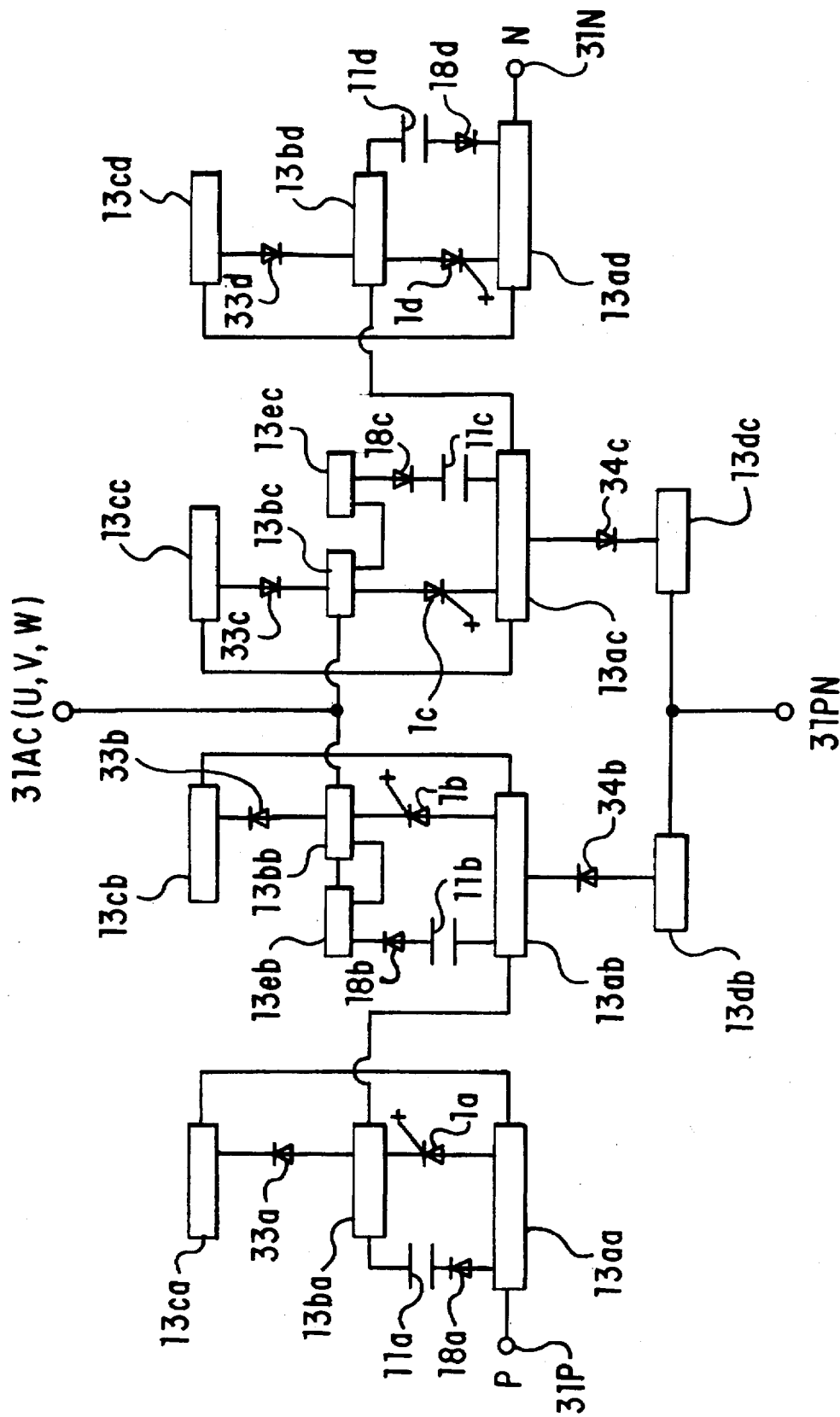
FIG. 10 is a circuit diagram showing the actual wiring of the arm shown in FIGS. 8 and 9.

In FIGS. 8 and 9, one arm is composed of four GTOs, each with the snubber circuit in the assembly structure shown in the first embodiment; wheeling diodes; a P electrode circuit bus 31P; a N electrode main circuit bus 31N; an AC bus 31AC; a neutral point bus 31PN; conductors 31 and gate units 32. FIG. 10 shows the actual wiring of the arm shown in FIGS. 8 and 9.

The following is a detailed description of each of GTO stack units 50a, 50b, 50c and 50d using FIG. 11 to FIG. 14 which respectively show cross-sections of the one arm shown in FIG. 8.

Figure 11:
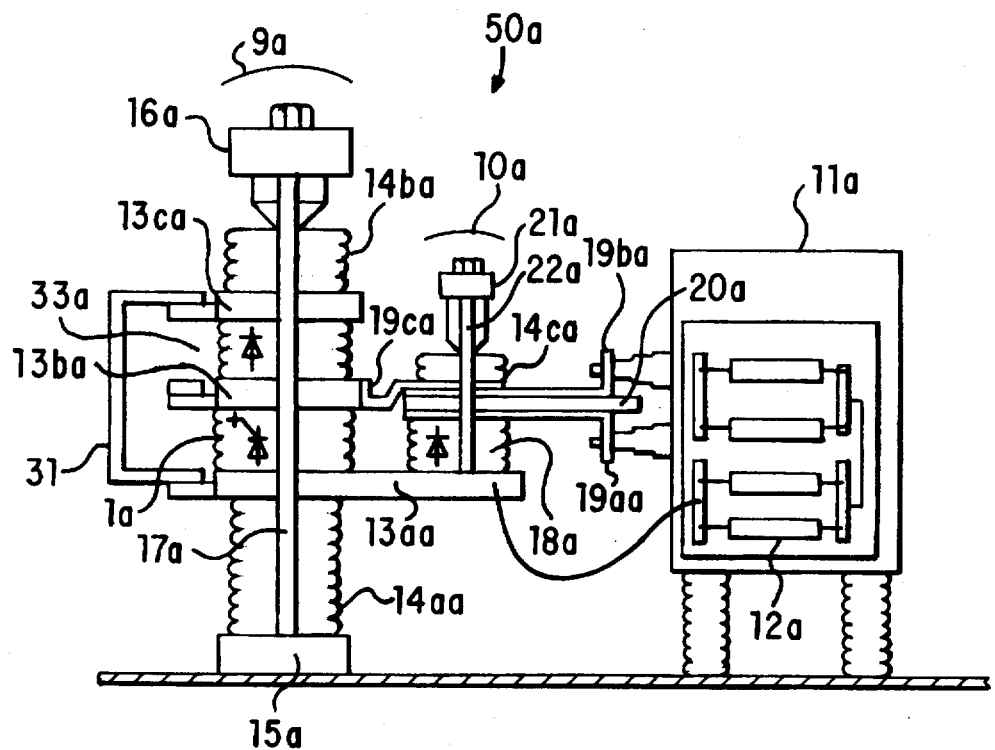
FIG. 11 is a side elevation showing the assembly structure of a GTO stack unit 50a on the line A—A in FIG. 8.

FIG. 11 is a side elevation showing the assembly structure of GTO stack unit 50a on the cross-section on the line A—A in FIG. 8.

In GTO stack unit 50a, a GTO stack 9a is composed by stacking an insulating seat 14aa; a water-cooled heat sink 13aa; a GTO 1a; a water-cooled heat sink 13ba; a wheeling diode 33a; a water-cooled heat sink 13ca and an insulating seat 14ba in that order. These are secured by a base 15a, a presser board 16a and studs 17a which are the stack frame parts. Also, a snubber diode stack 10a is composed by stacking heat sink 13aa; a snubber diode 18a; a conductor 19aa; an insulating spacer 20a; a conductor 19ba; a conductor 19ca and an insulating seat 14ca. These are secured by a presser board 21a and studs 22a. In this GTO stack unit 50a, the polarity of GTO 1a is designed such that the cathode is on top and the anode is underneath. Snubber diode 18a also has the cathode on top and the anode underneath. Wheeling diode 33a also has its cathode on top and its anode underneath. A snubber capacitor 11a and a snubber resistor 12a are provided and connected as in the first embodiment.

Figure 12:
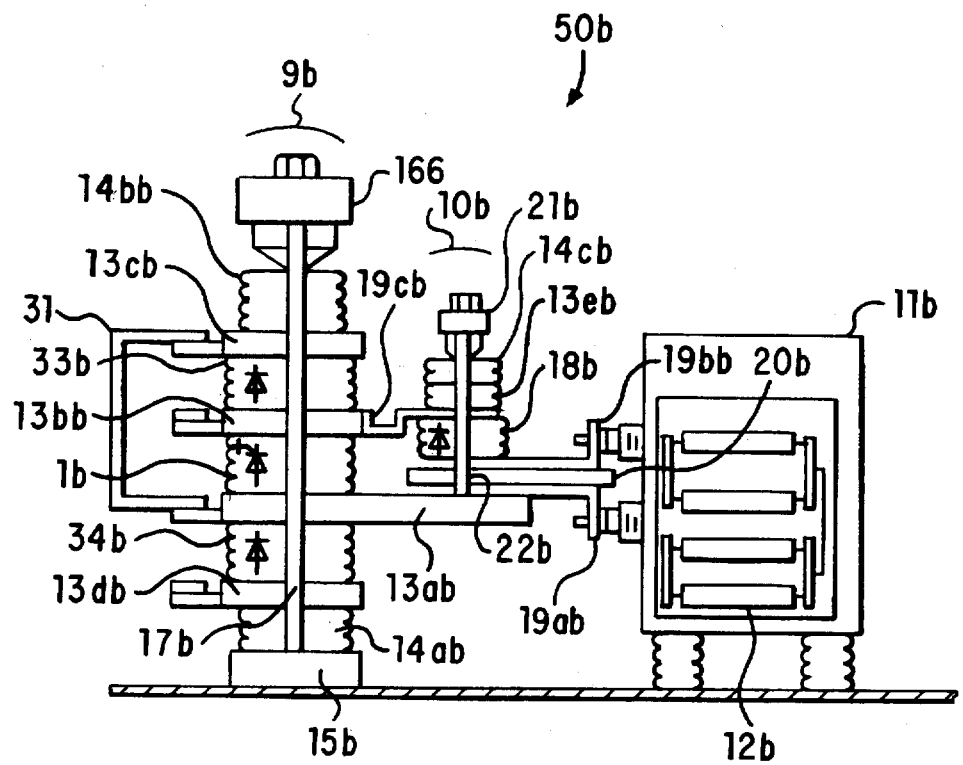
FIG. 12 is a side elevation showing the assembly structure of a GTO stack unit 50b on the line B—B in FIG. 8.

FIG. 12 is a side elevation showing the assembly structure of GTO stack unit 50b on the cross-section on the line B—B in FIG. 8.

In GTO stack unit 50b, a GTO stack 9b is composed by stacking an insulating seat 14ab; a water-cooled heat sink 13db; a neutral point clamp diode 34b; a water-cooled heat sink 13ab; a GTO 1b; a water-cooled heat sink 13bb; a wheeling diode 33b; a water-cooled heat sink 13cb and an insulating seat 14bb in that order. These are secured by a base 15b, a presser board 16b and studs 17b which are the stack frame parts. Also, a snubber diode stack 10b is composed by stacking heat sink 13ab; a conductor 19ab; an insulating spacer 20b; a conductor 19bb; a snubber diode 18b; a conductor 19cb; a heat sink 13eb and an insulating seat 14cb. These are secured by a presser board 21b and studs 22b. Also, as neutral point clamp diode 34b is cooled by water-cooled heat sink 13ab, the polarity of GTO 1b is determined by its relationship with the connection of the main circuit bus. Since, as shown in the drawing, GTO 1b is mounted such that the cathode is on top and the anode is underneath, the cathode of wheeling diode 33b is on top and its anode is underneath. In this case, as snubber diode 18b is difficult to cool by water-cooled heat sink 13ab due to insulating spacer 20b positioned therebetween, snubber diode 18b is cooled using water-cooled heat sink 13eb. Furthermore, the cathodes of clamp diode 34b and snubber diode 18b are mounted on top and their anodes underneath, respectively. A snubber capacitor 11b and a snubber resistor 12b are also provided and connected as in the first embodiment.

Figure 13:
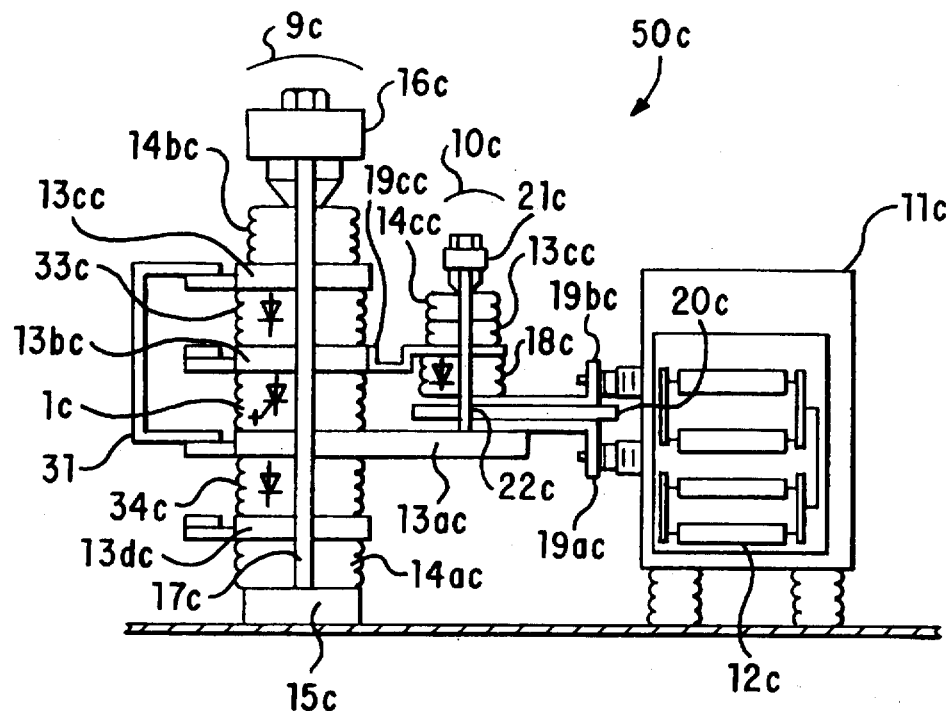
FIG. 13 is a side elevation showing the assembly structure of a GTO stack unit 50c on the line C—C in FIG. 8.

FIG. 13 is a side elevation showing the assembly structure of GTO stack unit 50c on the cross-section on the line c—c in FIG. 8.

In GTO stack unit 50c, a GTO stack 9c is composed by stacking insulating seat 14ac; a water-cooled heat sink 13dc; a neutral point clamp diode 34c; a water-cooled heat sink 13ac; a GTO 1c; a water-cooled heat sink 13bc; a wheeling diode 33c; a water-cooled heat sink 13cc and an insulating seat 14bc in that order. These are secured by a base 15c, a presser board 16c and studs 17c which are the stack frame parts. Also, a snubber diode stack 10c is composed by stacking heat sink 13ac; a conductor 19ac; an insulating spacer 20c; a conductor 19bc; a snubber diode 18c; a conductor 19cc; a heat sink 13ec and an insulating seat 14cc. These are secured by a presser board 21c and studs 22c. Also, as neutral point clamp diode 34c is cooled by water-cooled heat sink 13ac, the polarity of GTO 1c is determined by its relationship with the connection of the main circuit bus. Since, as shown in the drawing, GTO 1c is mounted such that the anode is on top and the cathode is underneath, the anode of wheeling diode 33c is on top and its cathode is underneath. In this case, as snubber diode 18c is difficult to cool by water-cooled heat sink 13ac due to insulating spacer 20c positioned therebetween, snubber diode 18c is cooled using water-cooled heat sink 13ec. Furthermore, the anodes of clamp diode 34c and snubber diode 18c are mounted on top and their cathodes underneath, respectively. A snubber capacitor 11 and a snubber resistor 12c are also provided and connected as in the first embodiment.

Figure 14:
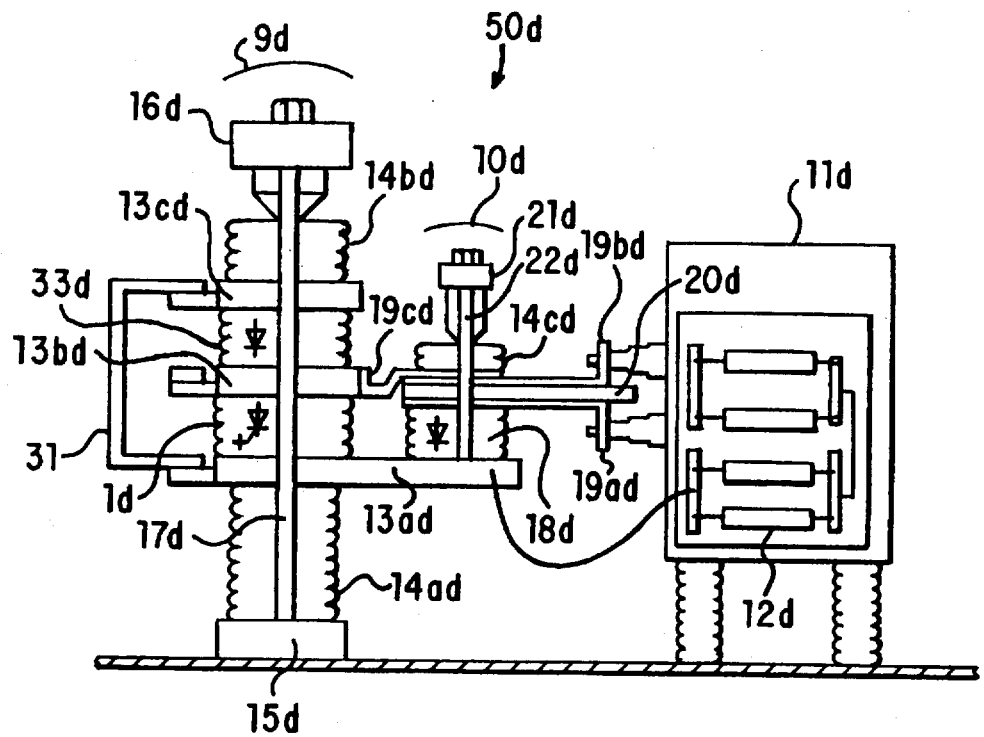
FIG. 14 is a side elevation showing the assembly structure of a GTO stack unit 50d on the line D—D in FIG. 8.

FIG. 14 is a side elevation showing the assembly structure of GTO stack unit 50d on the cross-section on the line D—D in FIG. 8. In GTO stack unit 50d, a GTO stack 9d is composed by stacking an insulating seat 14ad; a water-cooled heat sink 13ad; a GTO 1d; a water-cooled heat sink 13bd; a wheeling diode 33d; a water-cooled heat sink 13cd and an insulating seat 14bd in that order. These are secured by a base 15d, a presser board 16d and studs 17d which are the stack frame parts. Also, a snubber diode stack 10d is composed by stacking heat sink 13ad; a snubber diode 18d; a conductor 19ad; an insulating spacer 20d; a conductor 19bd; a conductor 19cd and an insulating seat 14cd. These are secured by a presser board 21d and studs 22d. In this GTO stack unit 50d, the polarity of GTO 1d is designed such that the anode is on top and the cathode is underneath. Snubber diode 18d also has the anode on top and the cathode underneath. Wheeling diode 33d also has its anode on top and its cathode underneath. A snubber capacitor 11d and a snubber resistor 12d are also provided and connected as in the first embodiment.

In this way, this embodiment has the characteristic of composing GTO stack units 50a, 50b, 50c and 50d for respective GTOs 1a, 1b, 1c and 1d. In those GTO stack units, in the assembly of each GTO stack unit, the polarities of GTO, wheeling diode and neutral point clamp diode are determined so that the snubber diode is arranged on top of the heat sink. Therefore, the GTO stack unit structures are not always identical. This embodiment is characterized in that a GTO main circuit structure has the characteristic of composing the main circuit by providing the necessary insulation for several of this type of GTO stack units, mounting them in frames aligned in the transverse direction and connecting each GTO satck unit with connecting conductors.

This type of assembly structure can be composed by arranging snubber diode, insulating spacer and connecting conductor in positions on respective horizontal surfaces. Therefore, assembly and replacement of semiconductor devices and other elements become simple. For instance, when snubber diode 18a of GTO stack unit 50a is to be replaced, snubber diode 18a can be readily replaced by loosening snubber diode stack 10a which snubber diode 18a is fastened, removing presser board 21a upward and removing the conductors and so on for the snubber circuit.

The same replacement can also be applied to the GTO. In particular, in the case of large capacity system wherein the weights of individual stack parts become heavier, the assembly and replacement can be performed readily.

Figure 15:
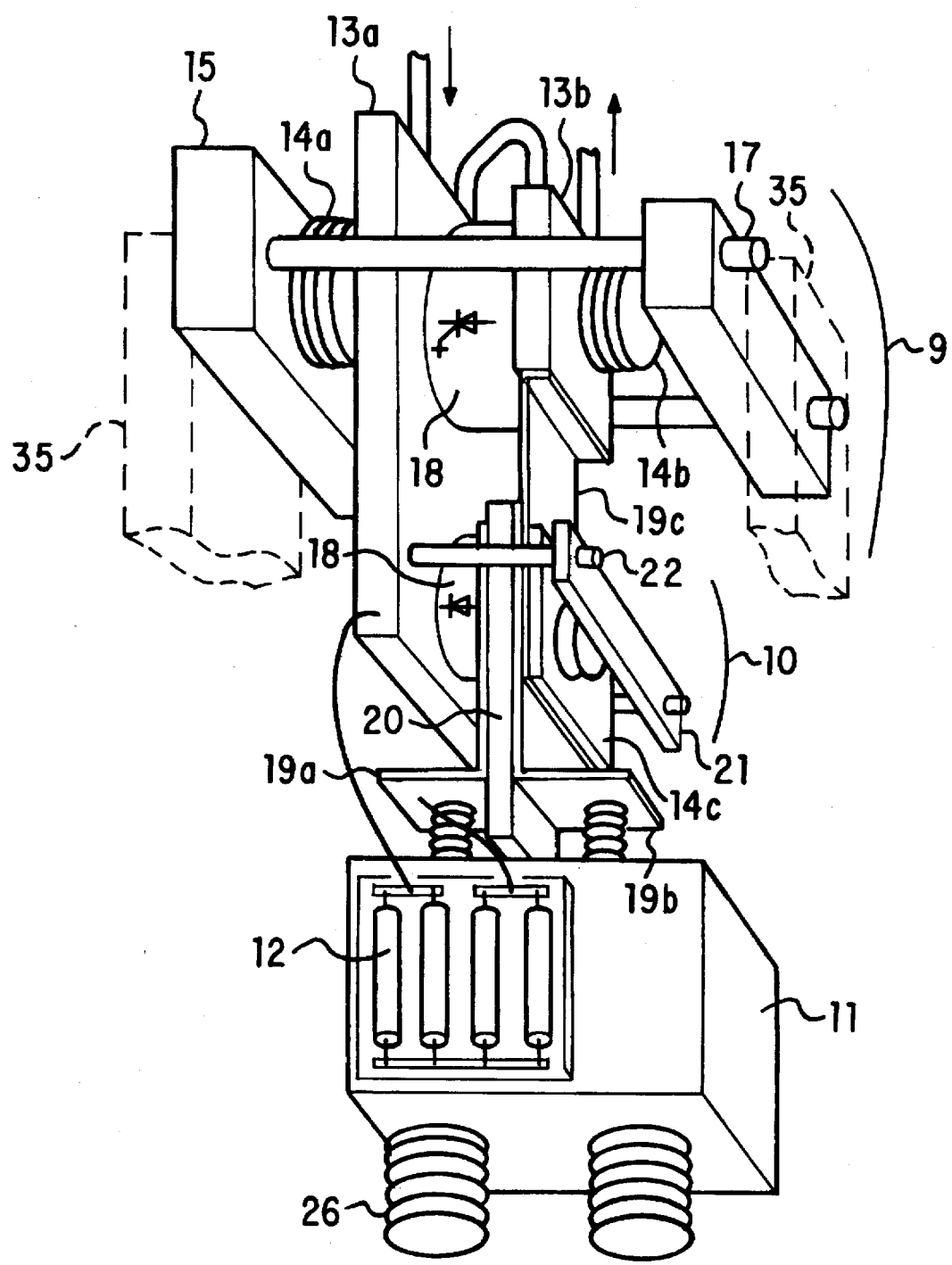
FIG. 15 is a schematic diagram showing the assembly structure of a GTO and a snubber circuit according to an eighth embodiment of this invention.
Figure 16:
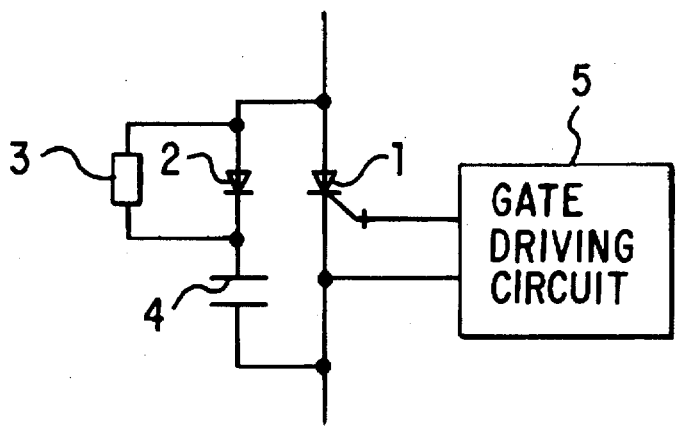
FIG. 16 is a circuit diagram of a GTO and a snubber circuit.
Figure 17:
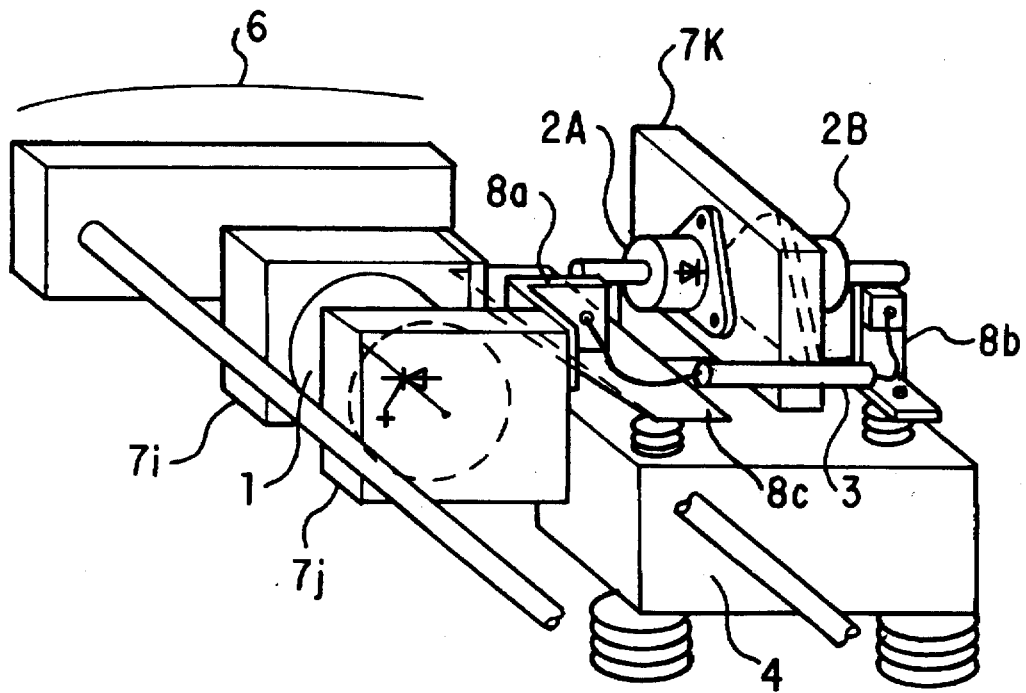
FIG. 17 is a schematic diagram showing a prior art assembly structure of the circuit shown in FIG. 16.
Figure 18A:
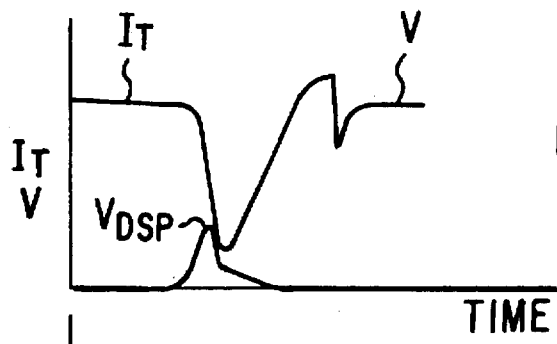
FIG. 18 is a waveform chart showing a current, a voltage and a snubber current when GTO is turned OFF.
Figure 18B:
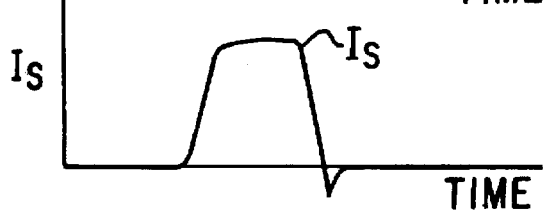
Figure 19:
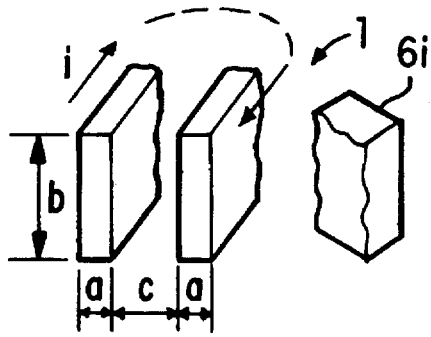
FIG. 19 is a drawing showing model return conductors for inductance calculation.
Figure 20:
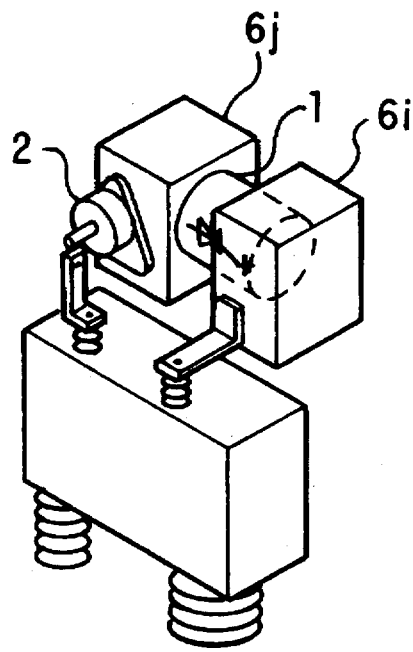
FIG. 20 is a schematic diagram showing another prior art assembly structure of the circuit shown in FIG. 16.

FIG. 15 shows an eighth embodiment. In the assembly structures of the GTO and the snubber circuit stated in the embodiments, each stack in a GTO stack unit has been positioned vertically. However, in this embodiment, the assembly structure is such that each stack is positioned horizontally in a GTO stack unit, and that the assembly structure of the first embodiment is arranged horizontally and supported with stack supports 35. Stack supports 35 are provided for supporting the stack because it is heavy.

In this embodiment each stack is arranged horizontally. Therefore, this embodiment has the same effects as the vertically arranged stacks described in the previous embodiments.

In the above-described embodiments, GTOs are used as self-turn-off switching devices. But this invention is not limited to these embodiment. This invention can also be applied to the case wherein IGBTs or the sames are used as self-turn-off switching devices.

As described above, according to this invention, an assembly structure of a self-turn-off switching device and a snubber circuit can be provided which reduces the effective inductance of the snubber circuit, which is important for reducing the spike voltage $V_{DSP}$ generated during the falling time in which the GTO current rapidly reduces (that is to say, the snubber circuit current rapidly increases). By this means, the capability of the self-turn-off switching device can be fully utilized. Also, the achievement of a low-inductance structure realizes compactization of the assembly structure of a self-turn-off switching device and a snubber circuit. As a result, miniaturization of the conversion system with high performance can be achieved.

Furthermore, according to this invention, even in the case of high voltage system, an assembly structure of a self-turn-off switching device and a snubber circuit which reduces the effective inductance of the snubber circuit can be achieved, while maintaining the withstand voltage capability.

Obviously, numerous modifications and variations of the present invention are possible in light of the above teachings. It is therefore to be understood that within the scope of the appended claims, the invention may be practiced otherwise than as specifically described herein.

What is claimed is:

1. An assembly structure of a self-turn-off switching device and a snubber circuit connected in parallel with said self-turn-off switching device, said snubber circuit being composed of at least a series circuit of a snubber diode and a snubber capacitor, said assembly structure comprising:

said self-turn-off switching device being a disk type package and having a first surface and a second surface parallel to each other wherein a first electrode is provided on said first surface and a second electrode is provided on said second surface;

said snubber diode being a disk type package with a first surface and a second surface parallel to each other and wherein a first snubber electrode is provided at said first surface and a second snubber electrode is provided at said second surface;

a conductive heat sink on which said self-turn-off switching device is mounted at said first surface thereof and said snubber diode is mounted at said first surface thereof, said conductive heat sink cooling said self-turn-off switching device and said snubber diode and connecting said first surface of said self-turn-off switching device and said first surface of said snubber diode;

a first conductor on which said snubber diode is mounted at said second surface thereof opposite to said first surface of said snubber diode for connecting said second surface of said snubber diode and a first terminal of said snubber capacitor wherein said snubber diode is positioned between said conductive heat sink and said first conductor and wherein the first surface of said snubber diode contacts with the conductive heat sink without a gap therebetween and wherein the second surface of the snubber diode contacts with the first conductor without a gap therebetween;

a second conductor positioned in parallel with said first conductor for connecting a second terminal of said snubber capacitor and said second surface of said self-turn-off switching device opposite to said first surface thereof; wherein said self-turn-off switching device is positioned between said conductive heat sink and said second conductor with the first surface of the self-turn-off switching device contacting the conductive sink without a gap therebetween and with the second surface of the self-turn-off switching device contacting with the second conductor without a gap therebetween; and an insulating spacer positioned between said first conductor and second conductor for insulating said first conductor and said second conductor wherein said insulator spacing contacts with the first conductor without a gap therebetween and contacts with said second conductor without a gap therebetween.

2. The assembly structure according to claim 1, wherein:

ends of said first conductor and ends of said second conductor are curled; and said insulating spacer positioned between said first and second conductors is broader than each breadth of said first and second conductors;

whereby the insulation between said first and second conductors is coordinated by a creeping insulation along a surface of said insulating spacer and a solid insulation of said insulating spacer.

3. The assembly structure according to claim 1, wherein:

said first conductor is provided with round rods on ends thereof;

said second conductor is provided with round rods on ends thereof;

said insulating spacer positioned between said first and second conductors is broader than each breadth of said first and second conductors;

whereby the insulation between said first and second conductors is coordinated by a creeping insulation along a surface of said insulating spacer and a solid insulation of said insulating spacer.

4. The assembly structure according to claim 1, wherein:

said insulating spacer is provided with semicylindrical grooves on both surfaces thereof, said grooves being located outside of overlapping projections of said first and second conductors, respectively;

said semicylindrical groove and between said insulating spacer and said first and second conductors, being coated with conductive paint; and said insulating spacer positioned between said first and second conductors is broader than each breadth of said first and second conductors;

whereby the insulation between said first and second conductors is coordinated by creeping insulation along a surface of said insulating spacer and a solid insulation of said insulating spacer.

5. An assembly structure of a self-turn-off switching device and a first snubber circuit and a second snubber circuit connected in parallel with said self-turn-off switching device, said first snubber circuit being composed of at least a series circuit of a first snubber diode and a first snubber capacitor, and said second snubber circuit being composed of at least a series circuit of a second snubber diode and a second snubber capacitor, said assembly structure comprising:

said self-turn-off switching device;

said first snubber diode;

said first snubber capacitor;

said second snubber diode;

said second snubber capacitor;

a conductive heat sink on which said self-turn-off switching device is mounted at a first surface thereof, said first snubber diode is mounted at a first surface thereof and said second snubber diode is mounted at a first surface thereof, for cooling said self-turn-off switching device and said first and second snubber diodes and for connecting said first surface of said self-turn-off switching device and said first surfaces of said first and second snubber diodes;

a first conductor on which said first snubber diode is mounted at a second surface thereof opposite to said first surface of said first snubber diode for connecting said second surface of said first snubber diode and a first terminal of said first snubber capacitor;

a second conductor positioned in parallel with said first conductor for connecting a second terminal of said first snubber capacitor and a second surface of said self-turn-off switching device opposite to said first surface thereof;

a first insulating spacer positioned between said first conductor and said second conductor for insulating said first conductor and said second conductor;

a third conductor on which said second snubber diode is mounted at a second surface thereof opposite to said first surface of said second snubber diode for connecting said second surface of said second snubber diode and a first terminal of said second snubber capacitor;

a fourth conductor positioned in parallel with said third conductor for connecting a second terminal of said second snubber capacitor and said second surface of said self-turn-off switching device opposite to said first surface thereof; and a second insulating spacer positioned between said third conductor and said fourth conductor for insulating said third conductor and said fourth conductor.

6. The assembly structure according to claim 5, wherein:

said first snubber diode and said first snubber capacitor are arranged in symmetrical positions with said second snubber diode and said second snubber capacitor about said self-turn-off switching device as their center, respectively; and said first and second conductors have the same conductor connection distance and conductor resistance as said third and fourth conductors.

7. The assembly structure according to claim 5, wherein:

said first snubber diode and said first snubber capacitor, and said second snubber diode and said second snubber capacitor are arranged on one side of said self-turn-off switching device;

a part of said second conductor and a part of said fourth conductor are composed of a common conductor; and said first and second conductors have the same conductor connection distance and conductor resistance as said third and fourth conductors.

8. An assembly structure of a self-turn-off switching device and a plurality of snubber circuits connected in parallel with said self-turn-off switching device, each of said snubber circuits being composed of at least a series circuit of a snubber diode and a snubber capacitor, said assembly structure, comprising;

said self-turn-off switching device;

said plurality of said snubber diodes;

said plurality of said snubber capacitors;

a conductive heat sink in which said self-turn-off switching device is mounted at a first surface thereof and each of said snubber diodes is mounted at a first surface thereof, for cooling said self-turn-off switching device and said snubber diodes and for connecting said first surface of said self-turn-off switching device and said first surfaces of said snubber diodes;

a plurality of first conductors, on each of which one of said snubber diodes is mounted at a second surface thereof opposite to said first surface of one of said snubber diodes for connecting said second surface of one of said snubber diodes and a first terminal of one of said snubber capacitors, respectively;

a plurality of second conductors, each being positioned in parallel with one of said first conductors for connecting a second terminal of one of said snubber capacitors and a second surface of said self-turn-off switching device opposite to said first surface thereof, respectively; and a plurality of insulating spacers, each being positioned between one of said first conductors and one of said second conductors for insulating one of said first conductors and one of said second conductors, respectively.

9. The assembly structure according to claim 8, wherein:

a plurality of said snubber diodes and a plurality of said snubber capacitors are arranged in point symmetrical positions about said self-turn-off switching device as their center, respectively; and a plurality of said first and second conductors have the same conductor connection distance and conductor resistance, respectively.

* * * * *